(12) United States Patent
Robertson et al.

(10) Patent No.: US 9,317,225 B2
(45) Date of Patent: Apr. 19, 2016

(54) METHOD AND APPARATUS FOR DYNAMICALLY CONFIGURING A FILTER PIPELINE FOR A PRINT DRIVER

(75) Inventors: Alan Kenneth Robertson, Rochester, NY (US); Glenn K Smith, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 323 days.

(21) Appl. No.: 13/115,368

(22) Filed: May 25, 2011

(65) Prior Publication Data

US 2012/0300248 A1 Nov. 29, 2012

(51) Int. Cl.
*G06F 3/12* (2006.01)
(52) U.S. Cl.
CPC ............ *G06F 3/1204* (2013.01); *G06F 3/1277* (2013.01); *G06F 3/1282* (2013.01)
(58) Field of Classification Search
CPC .... G06F 3/1277; G06F 3/1204; G06F 3/1282
USPC ....................................... 358/1.15
See application file for complete search history.

(56) References Cited

U.S. PATENT DOCUMENTS

| | | | |
|---|---|---|---|
| 6,212,574 B1* | 4/2001 | O'Rourke et al. | 719/321 |
| 2006/0028667 A1* | 2/2006 | Saito | 358/1.13 |
| 2007/0165260 A1* | 7/2007 | Fransazov | 358/1.13 |
| 2009/0237721 A1* | 9/2009 | Jeong et al. | 358/1.15 |
| 2009/0328031 A1* | 12/2009 | Pouyadou et al. | 717/174 |
| 2010/0066749 A1* | 3/2010 | Mihara et al. | 345/522 |
| 2010/0079778 A1* | 4/2010 | Kohama | 358/1.9 |
| 2010/0157365 A1* | 6/2010 | Jeong et al. | 358/1.15 |
| 2010/0214599 A1* | 8/2010 | Zhan | 358/1.15 |
| 2010/0235846 A1* | 9/2010 | Yamamichi | 719/327 |
| 2011/0161794 A1* | 6/2011 | Shiohara | 715/209 |

* cited by examiner

*Primary Examiner* — Marivelisse Santiago Cordero
*Assistant Examiner* — Kevin Ky
(74) *Attorney, Agent, or Firm* — Ronald E. Prass, Jr.; Prass LLP (57) ABSTRACT

A method and apparatus for managing filters in a filter pipeline in a print driver used with an image production device. The method may include configuring a filter pipeline in a print driver with one or more proxy filters, each proxy filter including logic to invoke an associated processing filter to perform functions similar to a corresponding processing filter alone, and enabling the print driver to be at least one of certified and digitally signed with the proxy filter without the associated processing filter being known or present.

16 Claims, 5 Drawing Sheets

METHOD AND APPARATUS FOR DYNAMICALLY CONFIGURING A FILTER PIPELINE FOR A PRINT DRIVER

BACKGROUND

Disclosed herein is a method and apparatus for creating dynamic print drivers that are based on Microsoft's Extensible Markup Language (XML) Paper Specification (XPS) for printing documents in the Windows printing infrastructure using a plurality of proxy filters in a filter pipeline within a print driver, as well as the corresponding apparatus and computer-readable medium.

Print drivers that are based on Microsoft's XML Paper Specification (XPS) contain a set of print processing modules that are called filters and a configuration file that describes which filters a print driver uses, the order in which the filters process the print job, and how data is passed between each filter and the inter-filter communicator (IFC). The configuration file is hardcoded in an XML file. A filter is a dynamic link library (DLL) that exports DLL functions. The specific function or functions that each filter performs depends on the print driver implementation and the printer requirements. A filter may perform only a single function, or it may perform multiple functions. This technique of using filters to perform the functions is limiting because the Microsoft's print spooler implementation forces the selection and order of these filters to be defined and fixed when the print driver is built and because the configuration file cannot be altered due to the requirement that the print driver needs to be certified and digitally signed. Altering any of the files that ship with a print driver would break its digital signature.

SUMMARY

A method and apparatus for managing filters in a filter pipeline in a print driver used with an image production device. The method may include configuring a filter pipeline in a print driver with one or more proxy filters, each proxy filter including logic to invoke an associated processing filter to perform functions similar to a corresponding processing filter alone, and enabling the print driver to be at least one of certified and digitally signed with the proxy filter without the associated processing filter being known or present.

DETAILED DESCRIPTION

Aspects of the embodiments disclosed herein relate to a method for using proxy filters in a filter pipeline in a print driver used with a printing device, as well as corresponding apparatus and computer-readable medium.

The disclosed embodiments may include a method for managing filters in a filter pipeline. The method includes configuring a filter pipeline in a print driver with at least one proxy filter. The proxy filter includes logic to invoke an associated processing filter to perform functions similar to the processing filter alone. The method further includes enabling the print driver to be certified and digitally signed without the processing filter being known or present at the time of certification or digital signing.

The disclosed embodiments may further include an image production device having a print driver. The print driver is configured to include a filter pipeline having a plurality of instances of a proxy filter. Each instance of the proxy filter is capable of being associated with a different processing filter. A combination of an instance of the proxy filter and a processing filter is capable of performing functions similar to functions of the processing filter alone. The print driver is digitally signed with the plurality of instances of the proxy filter in the filter pipeline.

The disclosed embodiments may further include a computer-readable medium storing instructions for managing a print driver for an image production device. The instructions may enable configuring a filter pipeline in a print driver with a proxy filter. The proxy filter includes logic to invoke an associated processing filter perform to the functions supported by the processing filter. The instructions further enable the print driver to be certified and digitally signed without potential processing filters being known or present during a first time period. The instructions then enable the set of processing filters to be updated during a second time period. Then, the print driver is allowed to be processed with the updated set of processing filters without the print driver having to be re-certified or digitally re-signed.

The disclosed embodiments provide a convenient and robust means by which consumers may purchase and add new value-added features to the existing, installed print drivers. Proxy filters instead of the processing filters are used to dynamically bind the set of processing filters at runtime. The combination of a proxy filter and an associated processing filter is configured to perform functions similar to the functions of a processing filter in the filter pipeline within a print driver. Generally, a print driver is developed with a fixed set of filter dynamic link libraries (DLLs). These filter DLLs are declared in the XML configuration file of the print driver. In some embodiments, these filter DLLs are replaced by the proxy filters. Each proxy filter is a standard filter DLL created in compliance with Microsoft's specifications to maintain compatibility. The proxy filters are generic filters that are configured to dynamically look for and load associated processing filters. These processing filters may be associated with the print driver's built-in features or add-in features.

In some embodiments, the print driver is built with a sufficient number of proxy filters to accommodate the print driver's built-in features plus a desired number of add-in features. It is possible that not all of the proxy filters built with a print driver are used. However, since the unused proxy filters add very little overhead to the filter pipeline, they do not noticeably impact the printing performance of the associated image production device.

In some embodiments, there may be multiple instances of an actual proxy filter with each instance of a proxy filter registered with a unique identification (also referred to as class identification or CLSID). These multiple instances of the proxy filter may share the same binary code of the actual proxy filter to avoid redundancy. Using embodiments of the invention, the printer manufacturers may not have to develop, test, and release multiple versions of every print driver, and the consumers may not have to purchase any enhanced version of the print driver, perform their internal print driver certification process, and upgrade the print drivers on all of their computers.

Figure 1:
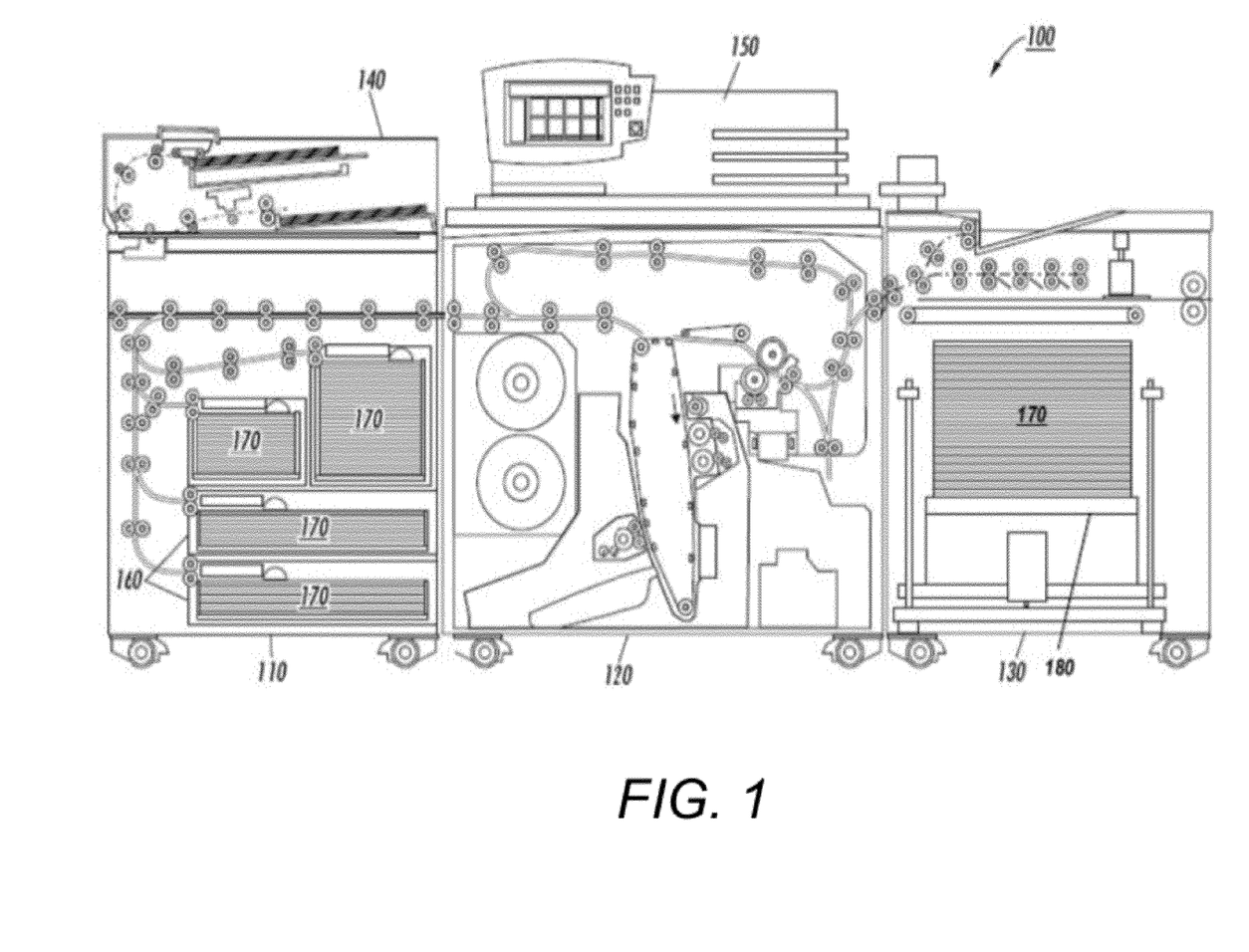
FIG. 1 is an exemplary diagram of an image production device in accordance with one possible embodiment of the disclosure.

FIG. 1 is an exemplary diagram of an image production device in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine. A print driver may be used. The print driver may include filters to add features to the final print output.

If the printer is also operable as a copier, the printer further includes a document feeder 140, which operates to convert signals from light reflected from original hard-copy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module includes any number of trays 160, each of which stores a media stack 170 or print sheets ("media") of a predetermined type (size, weight, color, coating, transparency, etc.) and includes a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media are advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, etc., with other media sheets in manners familiar in the art. The printed media may be place on a media stacker 180, for example.

Figure 2:
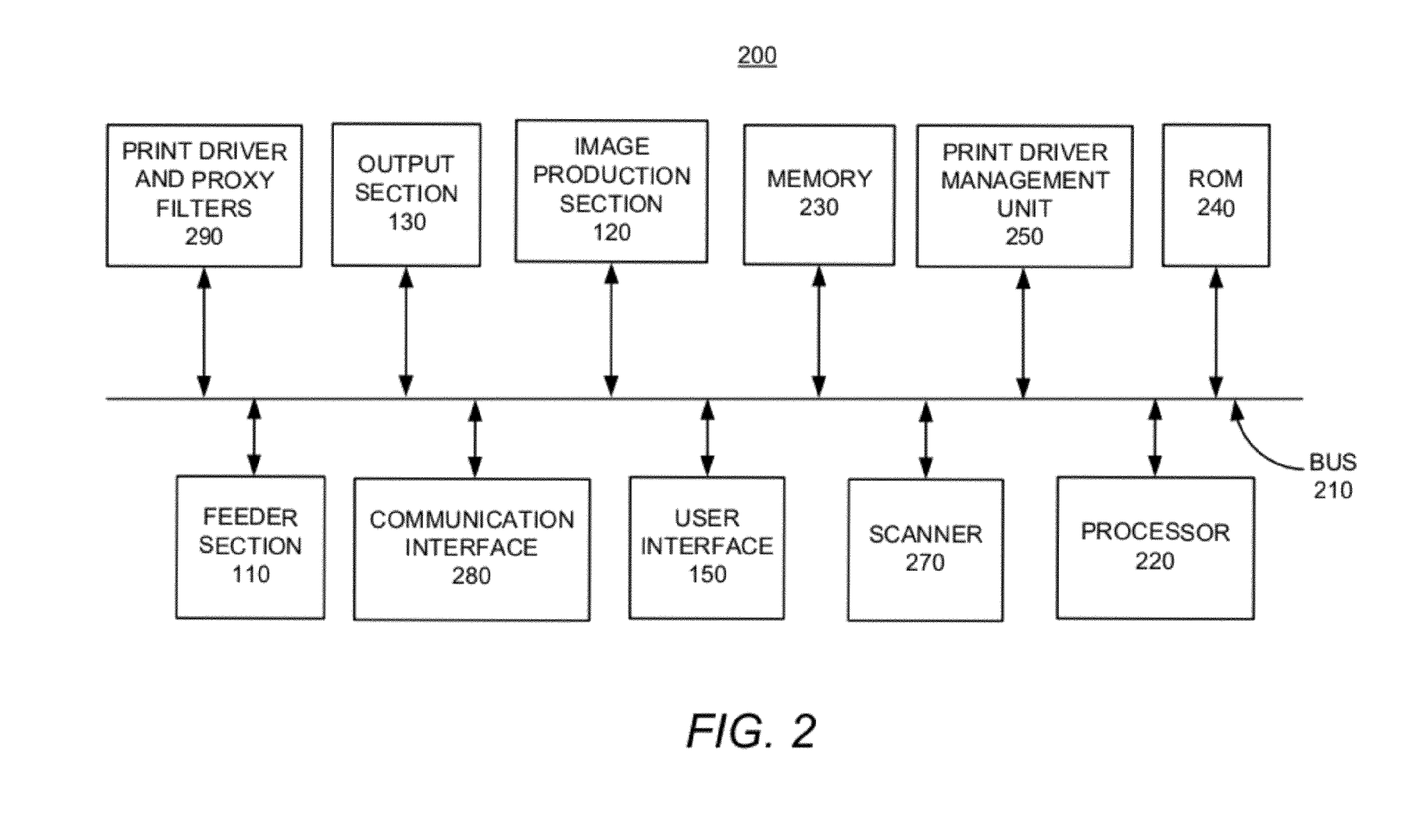
FIG. 2 is an exemplary block diagram of the image production device in accordance with one possible embodiment of the disclosure.

FIG. 2 is an exemplary block diagram of the processing logic of the image production device in accordance with one possible embodiment of the disclosure. Diagram 200 includes a bus 210, a processor 220, a memory 230, a read only memory (ROM) 240, a print driver management unit 250, a feeder section 110, an output section 130, a user interface 150, a communication interface 280, an image production section 120, a scanner 270, and print drivers 290. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, etc., for example.

The scanner 270 (or image scanner) may be any scanner known to one of skill in the art, such as a flat-bed scanner, document feeder scanner, etc. The image scanner 270 may be a common full-rate half-rate carriage design and can be made with high resolution (600 dpi or greater) at low cost, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that performs particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Operation of the print drivers 290 will be discussed below in relation to FIGS. 3A, 3B and 4 and the operation of the print driver management unit 250 that may use proxy filters to bind processing filters during runtime of the print driver 290 will be discussed in relation to the flowchart in FIG. 4, for example.

Figure 3A:
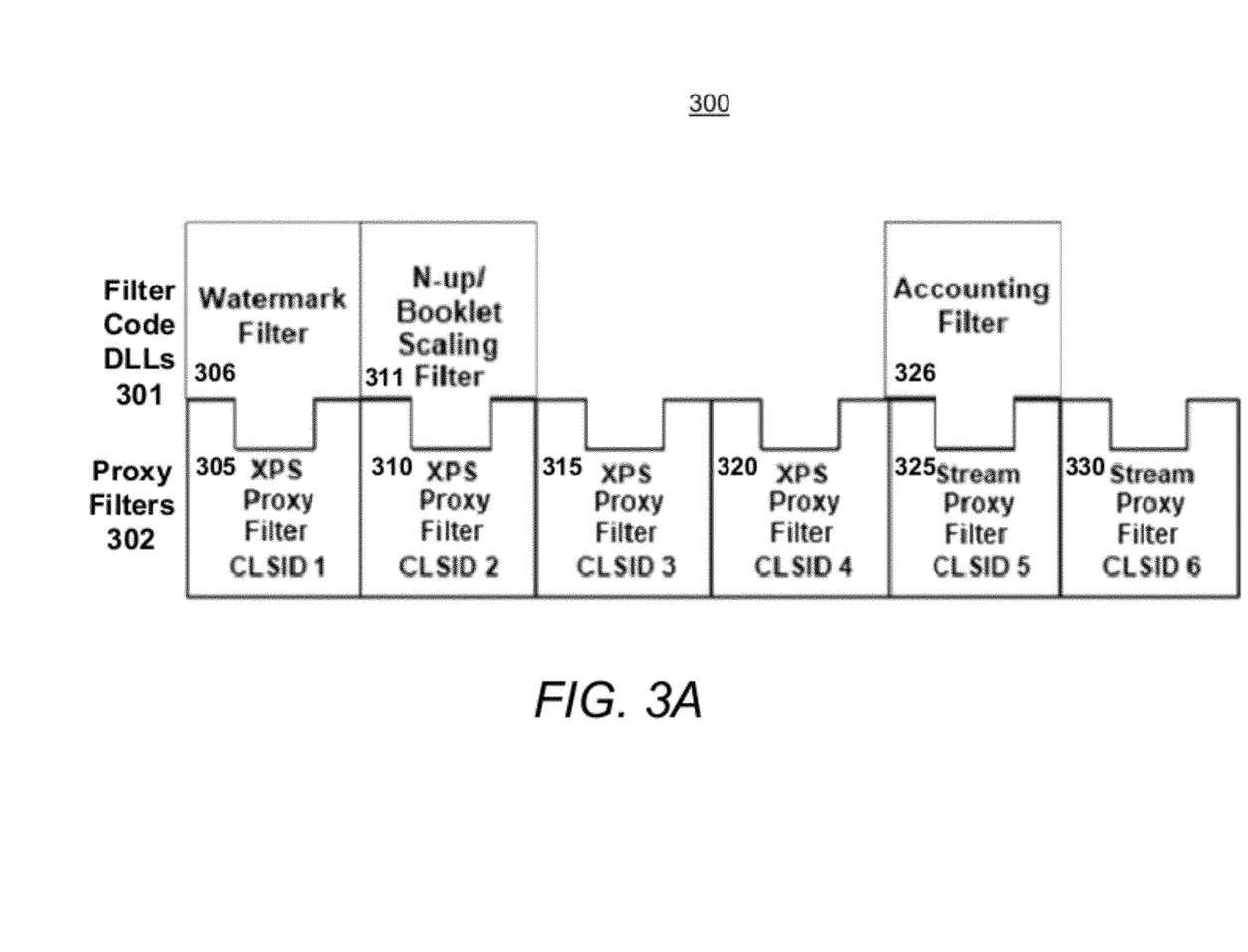
FIG. 3A is an exemplary diagram of a filter pipeline with the proxy filters in accordance with one possible embodiment of the disclosure.

FIG. 3A is an exemplary diagram of a filter pipeline 300 with the proxy filters 302 in accordance with one possible embodiment of the disclosure. The filter pipeline may include the XPS proxy filters (305, 310, 315 and 320) and the stream proxy filters (325, 330) in the proxy filter layer 302 and the processing filter DLLs layer 301. The XPS and stream proxy filters are developed according to the XPS and stream standard interfaces supported by Microsoft. Each of the XPS and stream proxy filters has an input and an output interface. Each of the XPS and stream proxy filters is registered in the print driver's XML configuration file as an XPS proxy filter or a stream proxy filter.

The input and output interfaces for a given proxy filter may be different from one another. Each of the XPS and stream filters are configured to conform to Microsoft's specifications for filters and may be assigned unique class identification (CLSID). As mentioned above, each of the XPS proxy filters 305, 310, 315 and 320 may actually be an instance of a proxy filter and may share the same binary code of the proxy filter to avoid redundancy and overhead.

Referring to FIG. 3A, a proxy filter in the proxy filter layer 302 may need to be associated with the appropriate processing filter in layer 301 to form a combination that provides the necessary printing features. In the current example, the XPS proxy filter 305 is associated with the watermark processing filter 306, the XPS proxy filter 310 is associated with the processing filter 311 which implements N-up, booklet, and scaling, and the stream proxy filter 325 is associated with processing filter 326 which implements accounting.

In some embodiments, the configuration data for the proxy filters 302 may be accessed and updated relying upon the automatic synchronization of a particular portion of the system registry from the print server to client computer systems. Each installed print queue has its own synchronized registry key named "PrinterDriverData". The "PrinterDriverData" key contains information about the print drivers for the network image production devices 100 to which the specified server is connected, where the entries that appear in this key are determined by the installed driver. Further, since the location of the above registry key is automatically kept in synch between the server and the client computer systems by the operating system, the information is made available to the client computer systems.

In the current example, the XPS proxy filters 315 and 320 are not associated with any processing filters. This may be acceptable since these unused proxy filters do not take much overhead and provide flexibility to be associated with other processing filters. In some embodiments, the number of proxy filters included in a filter pipeline is configured to be more than the number of filters shipped with the driver in order to leave room for future additions. It should be noted that, in some embodiments, the techniques described herein may operate with one or more proxy filters.

Priority values may be defined in order to facilitate the correct ordering of the proxy filters. When a print job is processed, each proxy filter is configured to read and process the configuration data and do nothing if the proxy filter is not associated with any processing filter (e.g., proxy filters 315 and 320). Data is simply passed to the next proxy filter in according to the priority values (or order) set in the configuration file. However, when the proxy filter is associated with a processing filter (e.g., proxy filters 305 and 310), the processing filter is loaded, and the proxy filter passes all calls to the processing filter.

It may also be noted, although not shown in FIG. 3A, both proxy and processing filters may be included in the filter pipeline using Microsoft's standard mechanisms. For example an XPS-to-Postscript conversion filter may be added as a filter after the proxy filter 320. That would enable the XPS driver to print to a device which does not support XPS natively, but can consume PostScript. Although the example illustrated in FIG. 3A includes both XPS proxy filters and stream proxy filters.

Figure 3B:
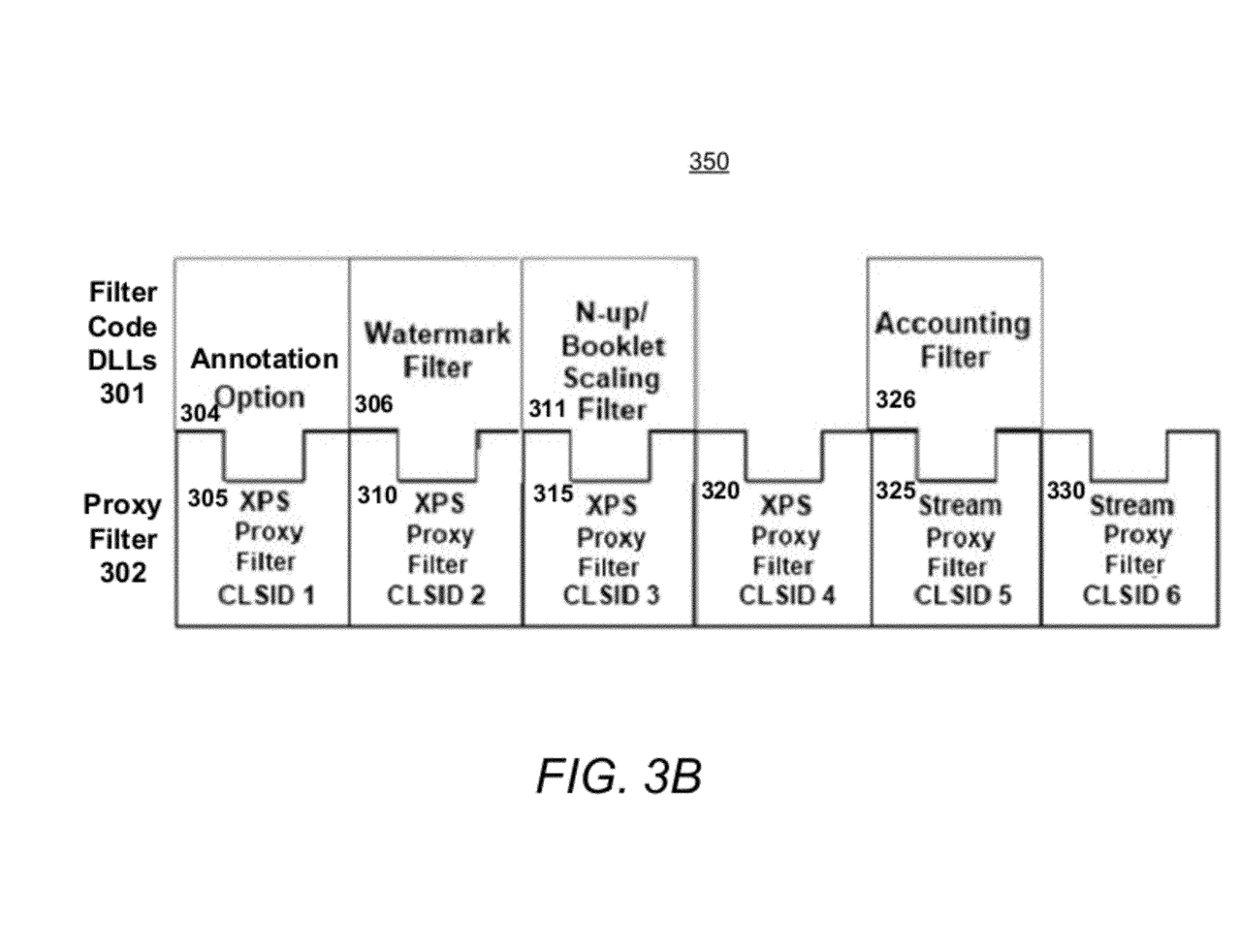
FIG. 3B is an exemplary diagram of a modified filter pipeline in accordance with one possible embodiment of the disclosure.

FIG. 3B is an exemplary diagram that illustrates the ease of adding new features to the print driver pipeline 350 in accordance with one possible embodiment of the disclosure. The print driver pipeline 350 may illustrate that the annotation option 304 has been added to the filter pipeline illustrated in FIG. 3A. In this example, the annotation option 304 is associated with the XPS proxy filter 305. It may be noted that the ordering of the filters is significant. Different filter orders will result in different print result. For example, a watermark that is drawn before a 4-Up transformation is applied is different from a watermark that is drawn after the 4-Up transformation because the number of printed pages changes. As mentioned, the order of the filters is indicated in the configuration data for the proxy filters.

Since any XPS proxy filter can load any XPS processing filter, and any stream proxy filter can load any stream processing filter, processing can be inserted or removed at any point in the filter pipeline and the other processing filters of the same type will be shifted accordingly. This is illustrated in FIG. 3B when the annotation option 304 is added. The watermark filter 306 and the N-up/booklet scaling filter 311 are shifted toward the right of the filter pipeline so that they are processed after the annotation option 304 is processed.

It may be noted that the annotation option 304 may not need to be identified when the print driver is developed since the configuration of the filter pipeline may be established after the print driver is developed. This ability may enable including proprietary third party filters which may only be licensed to be used with certain products. It may also enable including filters that may not yet be available at the time the print driver is developed. This enables filters to be added, removed, and ordered on the fly without re-certifying or digitally re-signing the print driver.

Figure 4:
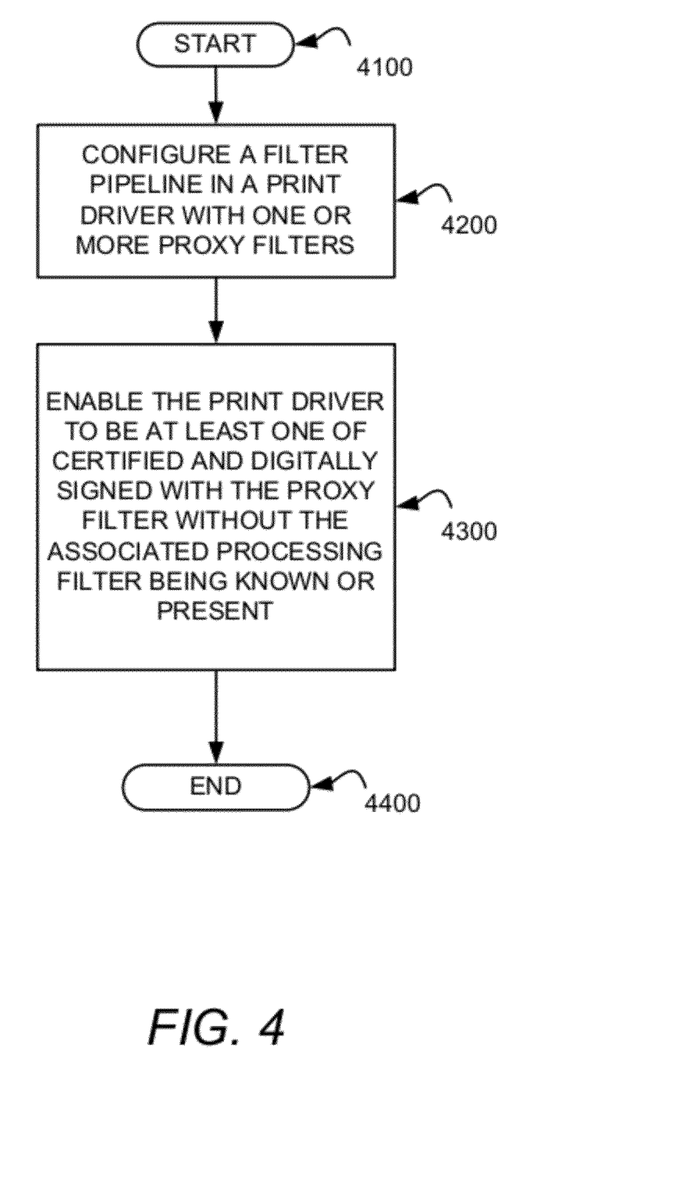
FIG. 4 is a flowchart of a proxy filter management process in accordance with one possible embodiment of the disclosure.

FIG. 4 is a flowchart of a proxy filter management process in accordance with one possible embodiment of the disclosure. The method may begin at step 4100 and may continue to step 4200 where the print driver management unit 250 may configure a filter pipeline in a print driver 290 with one or more proxy filters 320. Each proxy filter 302 may include logic to invoke an associated processing filter 301 to perform functions similar to a corresponding processing filter 301 alone. At step 4300, the print driver management unit 250 may enable the print driver 290 to be certified and/or digitally signed with the proxy filter 302 without the associated processing filter 301 being known or present. The process may then go to step 4400 and end.

The processing filters 301 may be invoked during runtime. In some embodiments, the processing filters 301 in a filter pipeline 300, 350 may be updated (e.g., added, removed, etc.). The proxy filters 302 may be defined according to and in compliance with the same specification (e.g., Microsoft's specifications) for filters, for example. The print driver 290 may be developed based on Microsoft's Extensible Markup Language (XML) Paper Specification (XPS), for example. The proxy filters 302 may be configured to dynamically look for and load the corresponding processing filters 301. Some set of processing filters 301 may be shipped with the print driver 290. Some processing filters 301 may be added as optional features, for example.

The print driver 290 with its proxy filters 302 may be certified or digitally signed, for example. It is possible that the print driver 290 may include proxy filters and processing filters. Each of the proxy filters 302 may be selectively associated with the appropriate processing filter 301, for example. A proxy filter 302 may not be associated with more than one processing filters 301, for example. It is possible that not all of the proxy filters 302 configured in the filter pipeline 300, 350 within the print driver 290 are used. During printing operation, when a proxy filter 302 is encountered, the corresponding processing filter 301 may be invoked, for example. At a subsequent time, when it is necessary to update the filter pipeline 300, 350, one or more processing filters 301 may be added, removed, reordered, etc. without having to re-certify and/or digitally re-sign the print driver 290, as shown in step 430, for example. The updating of the set of processing filters 301 may occur at each processing device individually or using a centralized server that forwards the updated set of processing filters to each processing device for installation (automatically or manually).

The filter pipeline 300, 350 may be configured to include multiple instances of the proxy filter 302, where all of the instances of the proxy filter 302 may share the same binary code of the proxy filter 302, and each of the instances of the proxy filter 302 may be associated with a unique identification. In this manner, each of the instances of the proxy filter 302 may be associated with a different processing filter 301. The print driver 290 may be certified and/or digitally signed with the filter pipeline 300, 350 having more instances of the proxy filter 302 more than a number of set of filter codes shipped with the print driver 250. At least one proxy filter 302 in the filter pipeline 300, 350 may not be associated with any set of filter codes during a first time period. The first instance of the proxy filter 302 in the filter pipeline 300, 350 may be associated with a first processing filter 301 during a second time period, and the print driver 250 may be processed during the second time period without having to be re-certified and/or digitally re-signed.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for managing filters in a filter pipeline, the method comprising:
using a print driver having a set of print processing filters and a configuration file which describes selection and order of the processing filters when processing a print job;
wherein the print driver is certified and digitally signed due to the selection and the order of the processing filters being defined and fixed;
configuring in a processor by using the print driver with a plurality of generic proxy filters and configuration data associated with a print job submission a filter pipeline, wherein each of the plurality of generic proxy filters including logic to invoke at least one of a set of separate associated processing filters to form a combination that provides a necessary printing feature and wherein each of the separate associated processing filters in the set performing functions corresponding to those performed by standard processing filters alone;
at least one of certifying and digitally signing the print driver with the plurality of generic proxy filters without any of the set of separate associated processing filters being known or present;
wherein when a proxy filter is associated with a processing filter, the processing filter is loaded, and the proxy filter passes all calls to the processing filter;
wherein the print driver is built with a sufficient number of proxy filters to accommodate the print driver's built-in features plus a desired number of add-in features;
updating the set of separate associated processing filters associated with the plurality of generic proxy filters; and
using the print driver with the plurality of generic proxy filters and the updated set of separate associated processing filters without having to at least one of re-certify and digitally re-sign the print driver;
wherein each of the plurality of generic proxy filters being associated with a unique identification, and at least one of the plurality of generic proxy filters not being associated with any of a set of filter codes when the print driver is certified or digitally signed;
wherein at least one of the plurality of generic proxy filters and a corresponding at least one of the set of separate associated processing filters are defined in compliance with a same specification for filters.

2. The method of claim 1, the print driver being developed based on Microsoft® Extensible Markup Language (XML) Paper Specification (XPS).

3. The method of claim 1, the updating of the set of separate associated processing filters occurring at one of each processing device individually and a centralized server that forwards the updated set of separate associated processing filters to each processing device for installation, the updated set of separate associated processing filters including at least one of added, deleted, and reordered separate associated processing filters.

4. The method of claim 1, the print driver being associated with at least one of a copier, a printer, a facsimile device, and a multi-function device.

5. The method of claim 1, the filter pipeline being configured to include multiple instances of a single generic proxy filter, all of the multiple instances of the single generic proxy filter sharing a same binary code and each of the multiple instances of the single generic proxy filter being associated with a unique identification.

6. The method of claim 5, each of the multiple instances of the single generic proxy filter being associated with a different one of the set of separate associated processing filters.

7. The method of claim 5, the print driver being at least one of certified and digitally signed with the filter pipeline having more instances of the single generic proxy filter than a number of the set of filter codes shipped with the print driver.

8. The method of claim 7, at least one of the multiple instances of the single generic proxy filter in the filter pipeline not being associated with any of the set of filter codes during a first time period.

9. The method of claim 8, separate associated processing filters being added, removed or reordered during one or more time periods subsequent to the first time period without the print driver having to be at least one of re-certified and digitally re-signed.

10. An image production system, comprising:
an image production section that deposits marking material on an image receiving medium substrate according to received data and instructions provided by one or more print drivers;
a print driver management unit that is programmed to:
wherein a print driver in the at least one of the one or more print drivers has a set of print processing filters and a configuration file which describes selection and order of the processing filters when processing a print job;
wherein the print driver is certified and digitally signed due to the selection and the order of the processing filters being defined and fixed;
configure a filter pipeline in at least one of the one or more print drivers with a plurality of generic proxy filters and configuration data associated with a print job submission, each of the plurality of generic proxy filters including logic to invoke at least one of a set of separate associated processing filters to form a combination that provides a necessary printing feature, the separate associated processing filters performing functions corresponding to those performed by standard processing filters alone, and
enable the at least one of the one or more print drivers to be at least one of certified and digitally signed with the plurality of generic proxy filters without any of the set of separate associated processing filters being known or present;
a storage device that stores at least some of the set of separate associated processing filters; and
a communication interface that exchanges data and control inputs between the image production section, the print driver management unit and the storage device;
wherein when a proxy filter is associated with a processing filter, the processing filter is loaded, and the proxy filter passes all calls to the processing filter;
wherein at least one of the plurality of generic proxy filters and a corresponding at least one of the set of separate associated processing filters being defined in compliance with a same specification for filters;
wherein each of the plurality of generic proxy filters being associated with a unique identification, and at least one of the plurality of generic proxy filters not being associated with any of a set of filter codes when the print driver is certified or digitally signed;
wherein the one or more print drivers are built with a sufficient number of proxy filters to accommodate the print driver's built-in features plus a desired number of add-in features.

11. The image production system of claim 10, the print driver being developed based on Microsoft® Extensible Markup Language (XML) Paper Specification (XPS).

12. The image production system of claim 11, an update to the filter pipeline as related to any of the plurality of generic proxy filters not requiring the print driver to be re-certified or digitally re-signed.

13. The image production system of claim 10, comprising an image production device that is one of a copier, a printer, a facsimile device, and a multi-function device housing the image production section.

14. A non-transitory computer-readable medium storing instructions that, when executed by a computing device, causes the computing device to execute a method for managing filters in a filter pipeline, the method comprising:
using a print driver having a set of print processing filters and a configuration file which describes selection and order of the processing filters when processing a print job;
wherein the print driver is certified and digitally signed due to the selection and the order of the processing filters being defined and fixed;
configuring in a processor by using the print driver with a plurality of generic proxy filters and configuration data associated with a print job submission a filter pipeline, wherein each of the plurality of generic proxy filters including logic to invoke at least one of a set of separate associated processing filters to form a combination that provides a necessary printing feature and wherein each of the separate associated processing filters in the set performing functions corresponding to those performed by standard processing filters alone;
at least one of certifying and digitally signing the print driver with the plurality of generic proxy filters without any of the set of separate associated processing filters being present during a first time period;
updating the set of separate associated processing filters during a second time period; and
enabling the print driver to be processed with the plurality of generic proxy filters and with the updated set of separate associated processing filters without the print driver having to be at least one of re-certified or digitally re-signed;
wherein at least one of the plurality of generic proxy filters and a corresponding at least one of the set of separate associated processing filters are defined in compliance with a same specification for filters;
wherein each of the plurality of generic proxy filters being associated with a unique identification, and at least one of the plurality of generic proxy filters not being associated with any of a set of filter codes when the print driver is certified or digitally signed;
wherein when a proxy filter is associated with a processing filter, the processing filter is loaded, and the proxy filter passes all calls to the processing filter;
wherein the print driver is built with a sufficient number of proxy filters to accommodate the print driver's built-in features plus a desired number of add-in features.

15. The non-transitory computer-readable medium of claim 14, least one of the plurality of generic proxy filters and a corresponding at least one of the set of separate associated processing filters being defined in compliance with a same specification for filters.

16. The non-transitory computer-readable medium of claim 14, the filter pipeline being configured to include multiple instances of a single generic proxy filter sharing a same binary code and each of the multiple instances of the single generic proxy filter being associated with a unique identification.

\* \* \* \* \*